Figure 1:
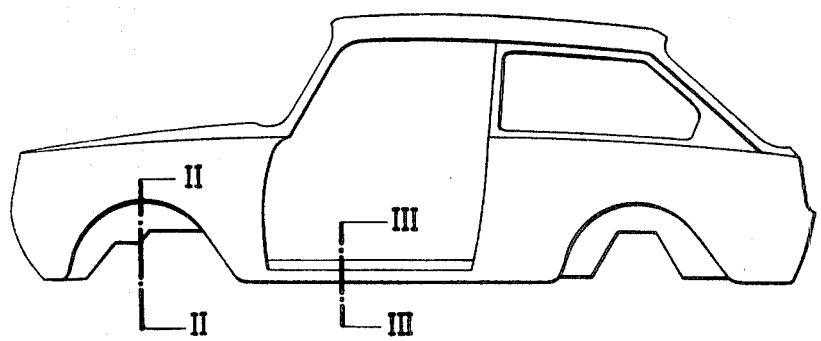

United States Patent

[11] 3,596,979

[72] Inventors Hermann Hablitzel
  Wolfsburg;
  Ernst Gallasch, Wolfsburg; Friedrich Jacob, Steimke, near Wittingen; Alfred Patzold, Wolfsburg, all of, Germany
[21] Appl. No. 781,889
[22] Filed Dec. 6, 1968
[45] Patented Aug. 3, 1971
[73] Assignee Messrs. Volkswagenwerk Aktiengesellschaft Wolfsburg, Germany
[32] Priority Dec. 7, 1967
[33] Germany
[31] P 16 55 650.6

[54] PLASTIC AUTOMOBILE BODY
  5 Claims, 6 Drawing Figs.
[52] U.S. Cl. ................................................ 296/31 P, 52/415
[51] Int. Cl. ................................................ B62d 29/04

[50] Field of Search ........................................ 296/31, 31 P, 28; 52/415, 436, 619, 264, 284; 287/20.92 D, 20.92 TG

[56] References Cited
UNITED STATES PATENTS

| | | | |
|---|---|---|---|
| 2,186,223 | 1/1940 | Willetts ........................ | 52/415 X |
| 2,242,269 | 5/1941 | Siebler ........................ | 296/31 P X |
| 2,728,702 | 12/1955 | Simon et al. ................. | 296/31 P UX |
| 3,151,573 | 10/1964 | Eggert ......................... | 296/29 X |
| 3,163,435 | 12/1964 | Krueger et al. ............... | 296/31 P X |
| 3,331,627 | 7/1967 | Schroder ...................... | 296/31 P |

FOREIGN PATENTS

| | | | |
|---|---|---|---|
| 910,251 | 11/1962 | Great Britain ................ | 296/31 P |
| 728,021 | 4/1955 | Great Britain ................ | 52/436 |

*Primary Examiner*—Benjamin Hersh
*Assistant Examiner*—John A. Pekar
*Attorney*—Watson, Cole, Grindle & Watson ABSTRACT: An automobile body of synthetic plastic materials of substantially two parts as two large components. The parts are produced by injection moulding and there are flat contacting surfaces for the contacting parts of the body.

PATENTED AUG 3 1971 3,596,979

INVENTORS
H. Hablitzel
E. Gallasch
F. Jacob
A. Pätzold
BY
Watson, Cole, Grindle & Watson
Attys.

PLASTIC AUTOMOBILE BODY

This invention relates to a foam mould for the manufacture of an automobile body from synthetic plastic materials, using the reaction injection-moulding method. Using this method, the two components of a polyurethane-duromer are injected through a mixing head into the mould cavity. After a comparatively short time, the mixture of the initial materials starts to react, with simultaneous expansion and pressure development. As a result, a smooth, hard surface layer is formed at the contact surfaces between the synthetic plastics material and the mould, while the intermediate layer shows the fine porous structure of a hard foam of conventional type. The mould pressure set up during the reaction amounts to approximately 1 kg./cm.$^2$.

The low working pressure necessary with this method makes possible the manufacture of parts having a large area. The object of the invention is consequently to form an automobile body of synthetic plastics material from substantially two parts and proposes to assemble the body with substantially flat connecting surfaces from a frame or chassis and an upper part of the body which comprises the roof, the lateral surfaces and also the front and rear closure sections. The tolerances which positively occur with parts having a large area act less strongly on flat connecting surfaces than with distorted abutment surfaces. The connection of the two large parts or components is preferably effected by adhesive bonding of overlapping extensions. The further development of this bonding technique is to be more fully explained hereinafter by constructional examples.

The two assembled large components only have to be supplemented by a few smaller components, that is a transverse wall, dashboard and back shelf. Inserts of the synthetic plastic parts serving for increasing the strength, that is, a wire mesh for the roof, tubes for pillars, transoms and bearers, can already be placed in the casting mould, as well as functional parts such as locks, hinges and the like.

Figure 2A:
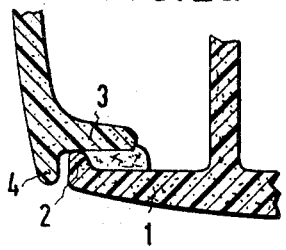
Figure 2B:
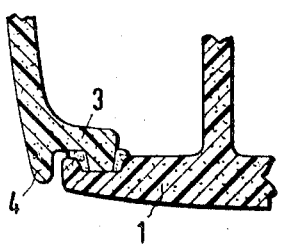
Figure 2C:
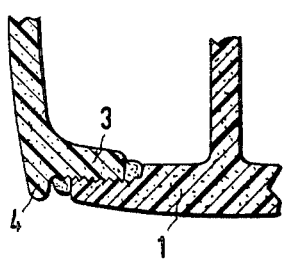
Figure 3:
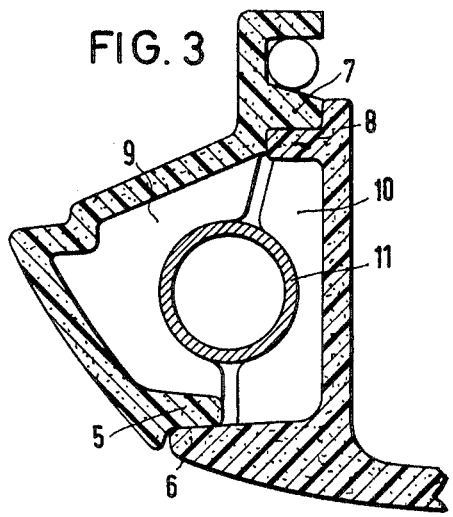
Figure 4:
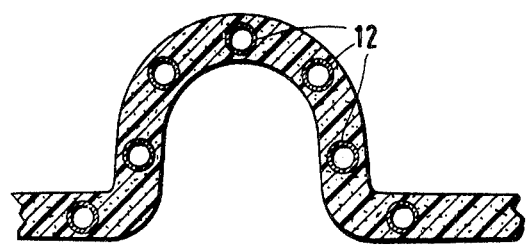

Further objects of the invention will be apparent from the following description when considered in connection with the accompanying drawing in which;

FIG. 1 is a side elevation of a synthetic plastics body according to the invention, FIG. 2a, 2b and 2c are cross sections showing three variants of a section taken along the line II–II of FIG. 1, FIG. 3 is a cross section taken along the line III–III in FIG. 1, and FIG. 4 is a cross section through the tunnel of the chassis of the body according to FIG. 1.

According to FIG. 1, an automobile body is composed of a frame with longitudinal and transverse bearers as well as the wheel housings and an upper body part, consisting of the roof, a lateral part including wings as well as rear and front closure elements, and in fact the upper part is let down from above on to the chassis and is supported on corresponding complementary abutments of the latter. The abutments extend substantially in flat form, in order to allow manufacturing tolerances to become of less consequence.

FIGS. 2a, 2b and 2c show different shaping possibilities for the point of connection of the two body components.

According to FIG. 2a, the abutment 1 of the chassis comprises a supporting bead 2, projecting therefrom on which is supported the projection 3 of the upper body part. In this way, a gap is formed to receive adhesive. According to FIG. 2b, a connection of tongue-and-groove configuration is provided for the two projections. The projection 3 of the upper body part comprises a covering edge portion 4 to protect the bonding position. Finally, the adhesive surfaces according to FIG. 2c are fluted or roughened in order to increase the strength of the bonded connection.

A filling material for increasing the strength, that is, glass fiber chips, is advantageously added to the plastics bonding agent.

According to FIG. 3, the bonding of the body components is effected by two projections 5 and 6 and 7 and 8 on both components, by providing a channel. The inside walls of this channel comprise preformed ribs 9 and 10 extending in the direction of the channel cross section, which ribs can serve to hold a tube as a heating tube 11. The tube 11 is preferably inserted before the bonding of the two large components and clamped between the ribs 9 and 10 at the time of bonding. The support of the tube 11 between the ribs guarantees a good heat insulation.

The fact that the body is composed of essentially two large sections makes it possible for reinforcing tubes extending longitudinally to be provided at the same time as guide elements for operating linkages or wire pulls. FIG. 4 shows by means of a section through the tunnel of the chassis the fitting of reinforcing tubes 12, into which can be fitted wire pulls or rods extending from the front part of the vehicle to the rear thereof.

We claim:

1. Self-supporting automobile body consisting of synthetic plastics materials, the parts of which are produced by reaction injection moulding, wherein the whole body is composed of a chassis component and an upper component, the latter comprising a roof, side panels and front and rear body parts, the two body components having connecting surfaces with overlapping projections to be bonded together, at least one of which is provided with a spacer bead on a bonding surface providing a gap to receive adhesive and one of which includes a covering edge portion to conceal the said gap.

2. Self-supporting automobile body according to claim 1, in which the bonding surfaces are roughened.

3. Self-supporting automobile body according to claim 1, in which the adhesive includes a strengthening filler material such as glass fiber material.

4. Self-supporting automobile body according to claim 1, in which there are two pairs of said connecting surfaces, arranged one above the other with the surfaces of each pair laterally offset from their respective body components, the portions of said components between said pairs of surfaces forming a channel when said components are united.

5. A self-supporting automobile body according to claim 1, wherein said components define between them a channel, a tube disposed within and lengthwise of said channel, and ribs projecting in opposed relation from the respective components transversely to the channel and clamping said tube between them.